US012737752B2

(12) United States Patent
Reinholdtsen

(10) Patent No.: US 12,737,752 B2
(45) Date of Patent: Sep. 15, 2026

(54) CRYPTOGRAPHICALLY LINKING A CRYPTOCURRENCY WALLET TO A PAYMENT CONFIRMATION FROM A DIGITAL PAYMENT PLATFORM ACCOUNT

(71) Applicant: INTER DOT BOX LLC, Woodinville, WA (US)

(72) Inventor: Paul Reinholdtsen, Woodinville, WA (US)

(73) Assignee: INTER BOX LLC, Woodinville, WA (US)

(*) Notice: Subject to any disclaimer, the term of this patent is extended or adjusted under 35 U.S.C. 154(b) by 0 days.

(21) Appl. No.: 19/057,697

(22) Filed: Feb. 19, 2025

(65) Prior Publication Data

US 2026/0245079 A1 Aug. 20, 2026

(51) Int. Cl.

| | |
|---|---|
| ***G06Q 20/38*** | (2012.01) |
| ***G06Q 20/06*** | (2012.01) |
| ***G06Q 20/22*** | (2012.01) |

(52) U.S. Cl.

CPC ..... *G06Q 20/3825* (2013.01); *G06Q 20/0655* (2013.01); *G06Q 20/223* (2013.01); *G06Q 20/3827* (2013.01)

(58) Field of Classification Search

None

See application file for complete search history.

(56) References Cited

U.S. PATENT DOCUMENTS

| | | | | |
|---|---|---|---|---|
| 12,367,483 | B1 * | 7/2025 | Pezeshki | G06Q 20/3829 |
| 2020/0074441 | A1 * | 3/2020 | Lorenz | G06Q 20/327 |
| 2024/0161090 | A1 * | 5/2024 | Fang | G06Q 20/3674 |
| 2024/0202815 | A1 * | 6/2024 | Nonni | G06Q 20/065 |
| 2024/0396754 | A1 * | 11/2024 | Wright | H04L 9/3239 |
| 2025/0335896 | A1 * | 10/2025 | Rodgers | G06Q 20/381 |

* cited by examiner

*Primary Examiner* — Jamie R Kucab

(74) *Attorney, Agent, or Firm* — Shook, Hardy & Bacon L.L.P.

(57) ABSTRACT

Methods and systems are provided for cryptographically linking a cryptocurrency wallet to a payment confirmation from a digital payment platform account. In embodiments described herein, a request for a signed transaction authorization is displayed by a cryptocurrency wallet based on a selection of the cryptocurrency wallet and a type of cryptocurrency. A transaction authorization code cryptographically computed based on the signed transaction authorization is displayed in response to receiving the signed transaction authorization. In response to receiving a payment confirmation from a digital payment platform, the signed transaction authorization is accessed based on the transaction authorization code, an amount of cryptocurrency is determined based on the amount of money from the payment confirmation and the type of cryptocurrency from the signed transaction authorization, and a cryptocurrency exchange platform transfers the amount of cryptocurrency to the cryptocurrency wallet from the signed transaction authorization.

20 Claims, 7 Drawing Sheets

300A

200

USER DEVICE 220

TRANSACTION AUTHORIZATION UI 222

CRYPTOCURRENCY WALLET UI 224

DIGITAL PAYMENT PLATFORM UI 226

TRANSACTION MANAGER 202

TRANSACTION AUTHORIZATION ENGINE 204

TRANSACTION PROCESSING ENGINE 206

CRYPTOCURRENCY WALLET CONNECTION PROTOCOLS 208

DIGITAL PAYMENT PLATFORM API 210

CRYPTOCURRENCY EXCHANGE PLATFORM API 212

KEY-VALUE DATA STORE 214

400

CAUSE DISPLAY OF A REQUEST FOR A SIGNED TRANSACTION AUTHORIZATION BY A CRYPTOCURRENCY WALLET BASED ON A SELECTION OF THE CRYPTOCURRENCY WALLET AND A TYPE OF CRYPTOCURRENCY ~402

RESPONSIVE TO RECEIVING THE SIGNED TRANSACTION AUTHORIZATION BY THE CRYPTOCURRENCY WALLET, CAUSE DISPLAY OF A TRANSACTION AUTHORIZATION CODE CRYPTOGRAPHICALLY COMPUTED BASED ON THE SIGNED TRANSACTION AUTHORIZATION ~404

RESPONSIVE TO RECEIVING A PAYMENT CONFIRMATION FROM A DIGITAL PAYMENT PLATFORM COMPRISING AN AMOUNT OF MONEY AND THE TRANSACTION AUTHORIZATION CODE, (1) ACCESS THE SIGNED TRANSACTION AUTHORIZATION BASED ON THE TRANSACTION AUTHORIZATION CODE, (2) DETERMINE AN AMOUNT OF CRYPTOCURRENCY BASED ON THE AMOUNT OF MONEY FROM THE PAYMENT CONFIRMATION AND THE TYPE OF CRYPTOCURRENCY FROM THE SIGNED TRANSACTION AUTHORIZATION, AND (3) CAUSE A CRYPTOCURRENCY EXCHANGE PLATFORM TO TRANSFER THE AMOUNT OF CRYPTOCURRENCY TO THE CRYPTOCURRENCY WALLET FROM THE SIGNED TRANSACTION AUTHORIZATION ~406

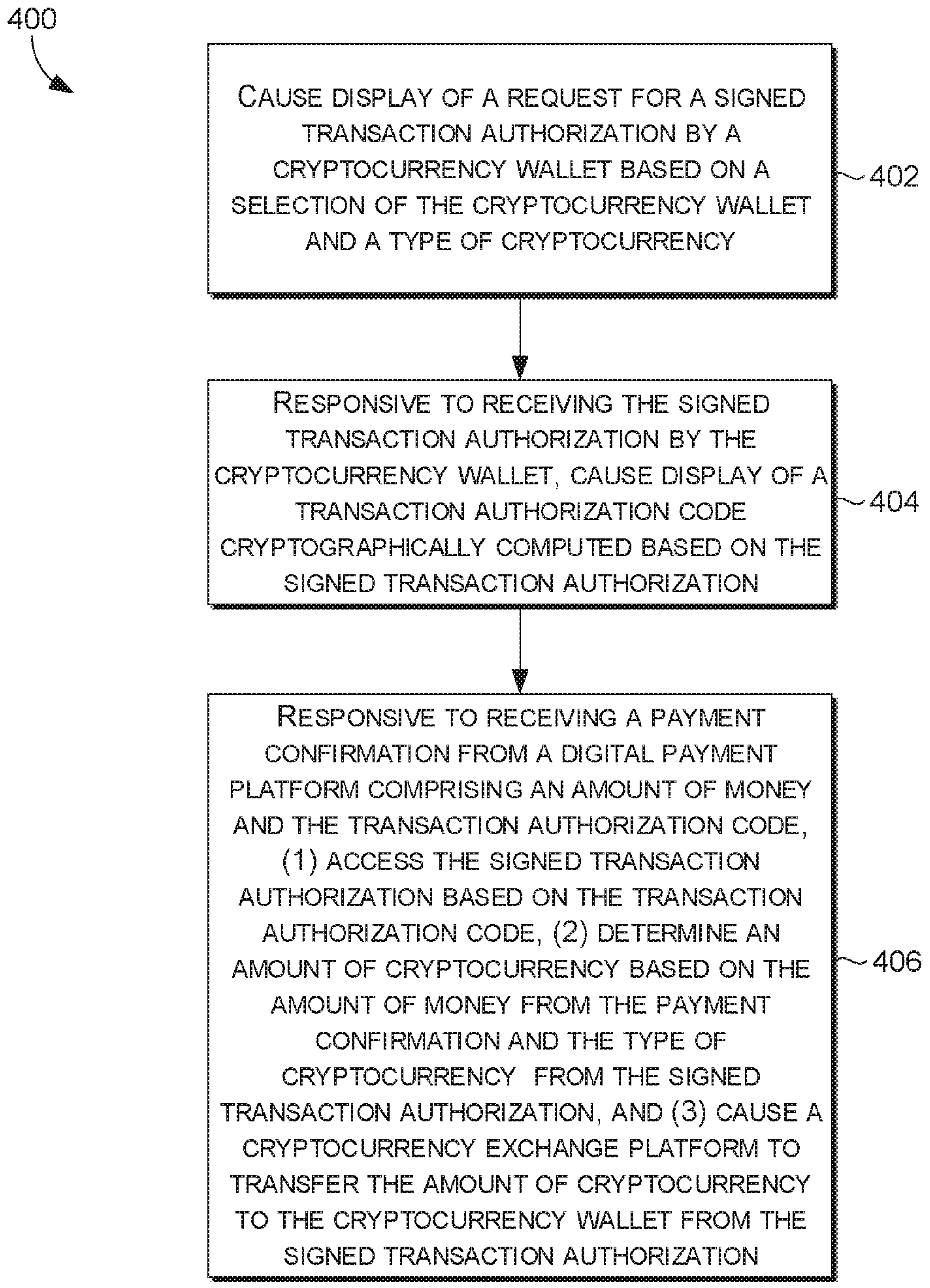

*FIG. 4*

CRYPTOGRAPHICALLY LINKING A CRYPTOCURRENCY WALLET TO A PAYMENT CONFIRMATION FROM A DIGITAL PAYMENT PLATFORM ACCOUNT

BACKGROUND

The current process for obtaining cryptocurrency is complex, privacy-invasive, poses financial safety risks, and causes a frustrating user experience. For example, in order to transfer funds from a bank account to a cryptocurrency exchange platform or directly to a non-custodial wallet, the user must undergo repetitive know your customer (KYC) checks that require sensitive information, such as government-issued identification and biometrics, to be shared to third-party platforms. By requiring sensitive information, the process increases a user's exposure to identity theft and data breaches. As another example, in order to transfer funds from a bank account to a cryptocurrency exchange platform or directly to a non-custodial wallet, the user is subject to transaction holds, which can typically last up to seven days. Transaction holds limit a user's ability to timely purchase cryptocurrency, thereby causing a frustrating user experience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, cryptographically linking a cryptocurrency wallet to a payment confirmation from a digital payment platform account. For example, a user initiates a transaction authorization to transfer cryptocurrency to a non-custodial cryptocurrency wallet owned by the user. The user selects the cryptocurrency wallet, a destination network of the cryptocurrency wallet, and a type of cryptocurrency. In response, a request for a signed transaction authorization by the cryptocurrency wallet is displayed to the user. Responsive to receiving the signed transaction authorization from the cryptocurrency wallet, a transaction authorization code cryptographically computed based on the signed transaction authorization is displayed to the user. The user sends money from the user's account on a digital payment platform to the transaction processor account name on the digital payment platform. The user includes the transaction authorization code when sending the money so that the payment confirmation from the digital payment platform includes the amount of money sent by the user and the transaction authorization code. In response to receiving the payment confirmation, (1) the signed transaction authorization is accessed based on the transaction authorization code, (2) an amount of cryptocurrency is determined based on the amount of money from the payment confirmation and the type of cryptocurrency from the signed transaction authorization, and (3) the amount of cryptocurrency is transferred from a cryptocurrency exchange platform to the cryptocurrency wallet from the signed transaction authorization.

BRIEF DESCRIPTION OF THE DRAWINGS

FIG. 4 is a process flow showing a method for cryptographically linking a cryptocurrency wallet to a payment confirmation from a digital payment platform account, in accordance with embodiments of the present disclosure.

DETAILED DESCRIPTION

Figure 1:
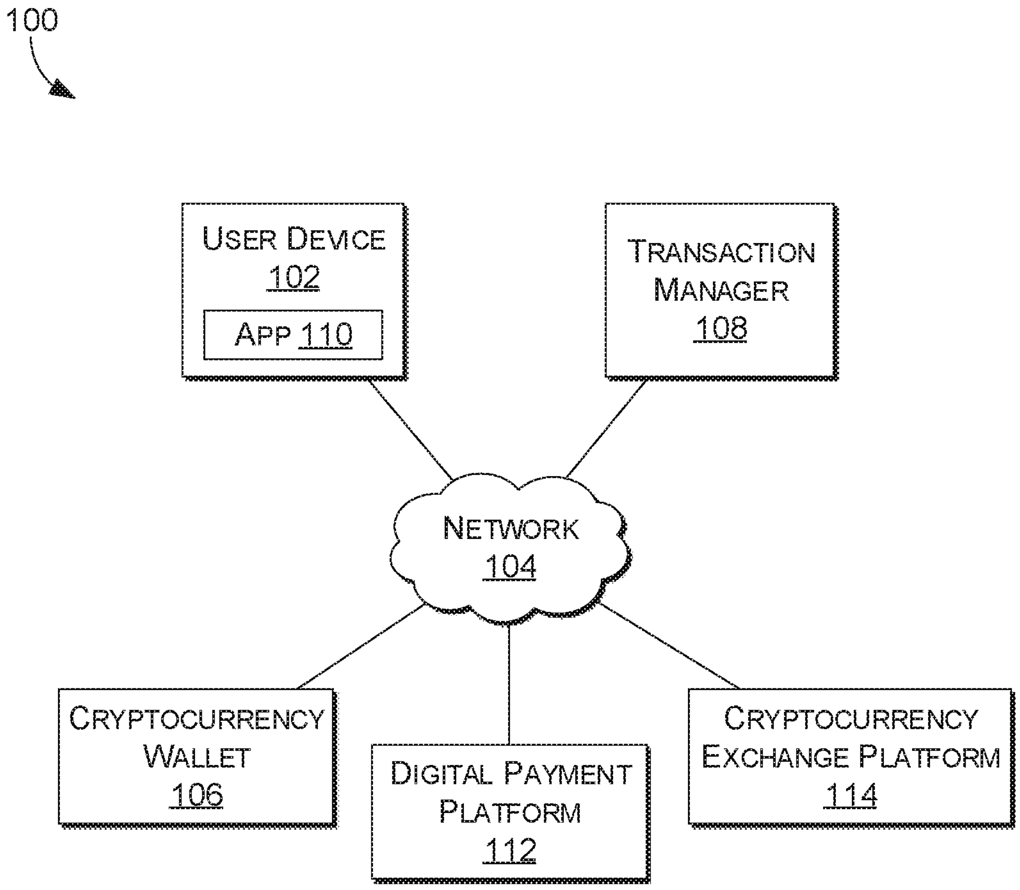
FIG. 1 depicts a diagram of an environment in which one or more embodiments of the present disclosure can be practiced, in accordance with various embodiments of the present disclosure.

Typically, in order to purchase cryptocurrency, a user opens an account on a cryptocurrency exchange platform with a custodial wallet (e.g., a cryptocurrency wallet where the private keys are managed by a third party, such as the cryptocurrency exchange platform). Before the user can purchase cryptocurrency, the user transfers funds from a bank account to the custodial wallet on the cryptocurrency exchange platform. After the user purchases cryptocurrency, the cryptocurrency is transferred to the custodial wallet on the cryptocurrency exchange platform. The user can then transfer the cryptocurrency from the custodial wallet on the cryptocurrency exchange platform to a non-custodial wallet (e.g., a cryptocurrency wallet where the private keys are managed by the wallet owner).

As discussed above, the current process for obtaining cryptocurrency is complex, privacy-invasive, poses financial safety risks, and causes a frustrating user experience. For example, in order to transfer funds from a bank account to a cryptocurrency exchange platform or directly to a non-custodial wallet, the user must undergo repetitive third party identification verification operations, such as KYC checks that require sensitive information, such as government-issued identification and biometrics, to be shared to third-party platforms. By requiring sensitive information be shared with third parties, the process increases a user's exposure to identity theft and data breaches. As another example, in order to transfer funds from a bank account to a cryptocurrency exchange platform or directly to a non-custodial wallet, the user is subject to fund transfer verification operations to transfer funds to their account on the platform before the user can purchase cryptocurrency, which can include transaction holds for transfer verification that typically last up to seven days. Transaction holds limit a user's ability to timely purchase cryptocurrency, thereby causing a frustrating user experience. Notwithstanding, the complex and privacy-invasive measures provide minimal regulatory benefit as funds can be freely transferred without oversight once the funds are transferred to a non-custodial wallet.

Accordingly, unnecessary computing resources are utilized with respect to conventional processes to obtain cryptocurrency. For example, computing and network resources are unnecessarily consumed in conventional processes for obtaining cryptocurrency that require third party identification verification operations and fund transfer verification operations. As an example, third party identification verification operations increase computer input/output operations and computational expenses to perform the identification verification operations and decreases network efficiency by decreasing throughput for the network and increasing the network latency to perform the identification verification operations. As another example, fund transfer verification operations increase computer input/output operations and computational expenses to perform the fund transfer verification operations and decreases network efficiency by decreasing throughput for the network and increasing the network latency to perform the fund transfer verification operations.

As such, embodiments of the present disclosure are directed to cryptographically linking a cryptocurrency wallet to a payment confirmation from a digital payment platform account in an efficient and effective manner. In this regard, the payment confirmation from the digital payment platform account can be used to send cryptocurrency to the cryptocurrency wallet that is cryptographically linked to the payment confirmation without additional identification verification operations or fund transfer verification operations to optimize use of computing and networking resources while minimizing user privacy concerns, minimizing security risks associated with purchasing cryptocurrency, minimizing a user's exposure to identity theft and data breaches based on sharing sensitive information with third parties, enhancing the user experience to obtain cryptocurrency by eliminating lengthy fund transfer verification operations, and increasing the safety for digital payment platform to cryptocurrency transactions.

Generally, and at a high level, embodiments described herein facilitate cryptographically linking a cryptocurrency wallet to a payment confirmation from a digital payment platform account. For example, a user initiates a transaction authorization to transfer cryptocurrency to a non-custodial cryptocurrency wallet owned by the user. The user selects the cryptocurrency wallet, a destination network of the cryptocurrency wallet, and a type of cryptocurrency. In response, a request for a signed transaction authorization by the cryptocurrency wallet is displayed to the user. Responsive to receiving the signed transaction authorization from the cryptocurrency wallet, a transaction authorization code cryptographically computed based on the signed transaction authorization is displayed to the user. The user sends money from the user's account on a digital payment platform to the transaction processor account name on the digital payment platform. The user includes the transaction authorization code when sending the money so that the payment confirmation from the digital payment platform includes the amount of money sent by the user and the transaction authorization code. In response to receiving the payment confirmation, (1) the signed transaction authorization is accessed based on the transaction authorization code, (2) an amount of cryptocurrency is determined based on the amount of money from the payment confirmation and the type of cryptocurrency from the signed transaction authorization, and (3) the amount of cryptocurrency is transferred from a cryptocurrency exchange platform to the cryptocurrency wallet from the signed transaction authorization.

In operation, a user initiates a transaction authorization to purchase cryptocurrency and send the cryptocurrency to a cryptocurrency wallet, such as a non-custodial wallet owned by the user. For example, a user navigates to a transaction authorization user interface (UI) of a website or application. The user connects the cryptocurrency wallet, selects a destination cryptocurrency wallet, a destination cryptocurrency wallet network and the type of cryptocurrency (e.g., Bitcoin, Ethereum, etc.) the user desires to purchase, and selects a UI element that initiates the transaction authorization.

In certain embodiments, a transaction authorization engine, also referred to as a transaction authorization application programming interface (API), utilizes cryptocurrency wallet connection protocols, such as WalletConnect, in order to allow the user to connect the cryptocurrency wallet via the transaction authorization UI. After connecting the cryptocurrency wallet via the cryptocurrency wallet connection protocols, the transaction authorization engine can request the cryptocurrency wallet to sign the transaction authorization. Thus, after a transaction authorization is initiated, the cryptocurrency wallet presents the transaction authorization to the user for approval via a cryptocurrency wallet UI, signs the transaction authorization using the private key of the cryptocurrency wallet, and sends the signed transaction authorization to the transaction authorization engine. Accordingly, in certain embodiments, the transaction authorization engine causes display of a request for a signed transaction authorization by a cryptocurrency wallet (e.g., a non-custodial cryptocurrency wallet) via a cryptocurrency wallet UI based on a selection of the cryptocurrency wallet, a destination network of the cryptocurrency wallet, and a type of cryptocurrency via a transaction authorization UI.

In certain embodiments, the transaction authorization engine generates a transaction authorization code cryptographically computed from the signed transaction authorization for display via the transaction authorization UI. The transaction authorization engine stores the transaction authorization code with the signed transaction authorization in a key-value data store. In this regard, in certain embodiments, responsive to receiving the signed transaction authorization from the cryptocurrency wallet, the transaction authorization engine causes display of a transaction authorization code cryptographically computed based on the signed transaction authorization via the transaction authorization UI. In certain embodiments, the transaction authorization engine cryptographically computes the transaction authorization code from the transaction authorization using a cryptographic hash function, such as the InterPlanetary File System (IPFS) Content Identifier (CID) algorithm.

In certain embodiments, the transaction authorization UI displays the transaction authorization code and a transaction processor account name (e.g., the email address of the transaction processing engine for payment to be sent via Zelle®) on a peer-to-peer (P2P) digital payment platform, such as a bank account-based P2P digital payment platform" (e.g., Zelle®) or a digital wallet-based P2P digital payment platform (e.g., Venmo®, Paypal®, etc.) in order for the user to send the money, such as the United States Dollar (USD) or other government-issued currency (e.g., fiat money) to process the transaction. In certain embodiments, the user sends the money via the P2P digital payment platform UI from the user's account on the P2P digital payment platform to the transaction processor account name on the P2P digital payment platform. The user includes the transaction authorization code with the money so that the payment confirmation includes the amount of money sent by the user and the transaction authorization code.

In certain embodiments, a transaction processing engine processes incoming payments from the P2P digital payment platform to transfer a corresponding amount of cryptocurrency to the user's cryptocurrency wallet. In this regard, responsive to the transaction processing engine receiving a payment confirmation from a digital payment platform via a digital payment platform API comprising an amount of money and the transaction authorization code, the transaction processing engine (1) accesses the signed transaction authorization based on the transaction authorization code from the key-value data store, (2) determines an amount of cryptocurrency based on the amount of money from the payment confirmation and the type of cryptocurrency from the signed transaction authorization, and (3) causes a cryptocurrency exchange platform to transfer the amount of cryptocurrency to the cryptocurrency wallet from the signed transaction authorization via a cryptocurrency exchange platform API. After the transaction processing engine causes the cryptocurrency exchange platform to transfer the amount of cryptocurrency to the cryptocurrency wallet, the transaction processing engine stores a cryptocurrency transfer confirmation (e.g., cryptocurrency transfer receipt) with the corresponding signed transfer authorization and corresponding transaction authorization code.

In this regard, in certain embodiments, cryptographically linking the cryptocurrency wallet to the payment confirmation from the digital payment platform account verifies that the same user controls both the digital payment platform account (e.g., bank account) and the cryptocurrency wallet to ensure that transfers occur exclusively between accounts owned by the same user, thereby reducing identity theft risks without requiring redundant KYC checks. Further, in certain embodiments, cryptographically linking the cryptocurrency wallet to the payment confirmation from the digital payment platform account ensures that payment goes where expected.

In certain embodiments, a user initiates a transaction via a website or application, such as an ecommerce website or application. For example, a user initiates a transaction via an e-commerce website and selects an option to pay via a digital payment platform. In this regard, the transaction authorization engine causes display of a request for a transaction authorization comprising transaction details of a transaction. For example, the transaction details can include a transaction identifier for the particular transaction, customer information, such as the customer's account, name, email billing address, shipping address, and/or other customer information, payment information, such as the payment amount due for the transaction, product or service information, such as the product or service name that the customer desires to purchase, quantities, prices and/or other details regarding the product or service that customer desire to purchase, and/or the like.

In certain embodiments, responsive to receiving the transaction authorization via the website or application, the transaction authorization engine causes display of a transaction authorization code cryptographically computed based on the transaction authorization. For example, the transaction authorization code can be cryptographically computed based on the transaction details of the transaction in order to cryptographically link the transaction to the transaction authorization code. The transaction authorization engine stores the transaction authorization code with the transaction authorization in the key-value data store.

In certain embodiments, the user sends the money via the P2P digital payment platform from the user's account and includes the transaction authorization code with the payment. For example, the user sends the payment with the transaction authorization code from the user's account on the P2P digital payment platform to the transaction processor account name, such as the ecommerce account name, on the P2P digital payment platform. In this regard, responsive to the transaction processing engine receiving a payment confirmation from a digital payment platform via the digital payment platform API comprising an amount of money and the transaction authorization code, the transaction processing engine (1) accesses the transaction authorization based on the transaction authorization code from the key-value data store and (2) initiates the transaction based on the transaction details and the amount of money. For example, the transaction processing engine determines whether the amount of money meets the required amount of money of the transaction details before confirming the transaction to initiate providing the customer with the purchased product or service. As the transaction is cryptographically linked to the payment confirmation via the transaction authorization code, the website or application can accept payment via the digital payment platform without requiring the user to link their digital payment account, thereby improving privacy and computational efficiency to accept payment from the digital payment platform.

Advantageously, efficiencies of computing and network resources can be enhanced using implementations described herein. In particular, by cryptographically linking a cryptocurrency wallet to a payment confirmation from a digital payment platform account provides for an efficient use of computing resources as compared to conventional processes to obtain cryptocurrency that require third party identification verification operations and fund transfer verification operations. For example, the technology described herein conserves network resources as the amount of data (e.g., corresponding to third party identification verification operations and fund transfer verification operations) sent over a computer network is decreased, thereby decreasing computational costs for the network, increasing the throughput for the network, and decreasing the network latency. Further, the technology described herein minimizes user privacy concerns, minimizes security risks associated with purchasing cryptocurrency, minimizes a user's exposure to identity theft and data breaches based on sharing sensitive information with third parties, enhances the user experience to obtain cryptocurrency by eliminating lengthy fund transfer verification operations, and increases the safety for digital payment platform to cryptocurrency transactions.

Various terms are used throughout the description of embodiments provided herein. A brief overview of such terms and phrases is provided here for ease of understanding, but more details of these terms and phrases is provided throughout.

A "cryptocurrency exchange platform" generally refers to an online service that facilitates the buying, selling, and trading of cryptocurrencies. Cryptocurrency exchange platforms provide users with a secure environment to exchange digital assets, such as Bitcoin, Ethereum, and other cryptocurrencies, for fiat currencies or other digital assets. Cryptocurrency exchange platforms typically offer features like real-time market data, order matching, and secure storage of funds in custodial wallets managed by the cryptocurrency exchange platform. Examples of cryptocurrency exchange platforms include Coinbase®, Kraken®, etc.

A "cryptocurrency wallet" is a software program or hardware device that stores private and public keys for cryptocurrency transactions to allow users to send, receive, and manage digital assets. Typically, cryptocurrency wallets do not store the actual cryptocurrency but rather the keys that provide access to the digital assets on the blockchain. A "custodial wallet" generally refers to a cryptocurrency wallet where a third party, such as a cryptocurrency exchange platform, manages the keys on behalf of the user. A "non-custodial wallet" generally refers to a cryptocurrency wallet where the user has full control over the keys of the wallet. In some instances, a non-custodial wallet can be a "cold wallet," which is a hardware device that stores the cryptocurrency keys offline to protect the keys from potential online threats such as hacking, malware, and other cyber-attacks.

A "peer-to-peer (P2P) digital payment platform", such as a "bank account-based P2P digital payment platform" (e.g., Zelle®) or a "digital wallet-based P2P digital payment platform" (e.g., Venmo®, Paypal®, etc.) is a digital service that allows individuals to transfer money directly to one another without the need for intermediaries like banks or credit card companies. Bank account-based P2P digital payment platforms allow users to send and receive money directly from their bank accounts. For example, bank account-based P2P digital payment platforms, such as Zelle®, can be integrated into the mobile banking applications of participating financial institutions, thereby allowing transactions to be processed directly between the sender's and recipient's bank accounts by utilizing a real-time payment network to facilitate immediate and secure transfers, ensuring that funds move almost instantly. By transferring money directly between bank accounts without intermediaries, the time for funds to become available can be significantly reduced. Digital wallet-based P2P digital payment platforms allow users to store funds in a digital wallet and transfer money to others within the same platform. Users can fund their digital wallets using their bank accounts, credit cards, or debit cards. By transferring money directly between digital wallets of the platform without intermediaries, the time for funds to become available can be significantly reduced.

Turning to FIG. 1, FIG. 1 depicts an example configuration of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 7.

It should be understood that operating environment 100 shown in FIG. 1 is an example of one suitable operating environment. Among other components not shown, operating environment 100 includes a user device 102, network 104, cryptocurrency wallet 106, digital payment platform 112, cryptocurrency exchange platform 114, and transaction manager 108. Each of the components shown in FIG. 1 can be implemented via any type of computing device, such as one or more of computing device 700 described in connection to FIG. 7, for example.

These components can communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, one or more private networks, one or more cellular networks, one or more P2P networks, one or more mobile networks, or a combination of networks. Where network 104 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 104 is not described in significant detail.

It should be understood that any number of user devices, servers, and other components can be employed within operating environment 100 within the scope of the present disclosure. Each can comprise a single device or multiple devices cooperating in a distributed environment.

User device 102 can be any type of computing device capable of being operated by an individual(s) or entity(s). For example, in some implementations, such devices are the type of computing device described in relation to FIG. 7. By way of example and not limitation, user devices can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device 102 can include one or more processors, and one or more computer-readable media. The computer-readable media may include computer-readable instructions executable by the one or more processors. The instructions may be embodied by one or more applications, such as application 110 shown in FIG. 1. Application 110 is referred to as single applications for simplicity, but its functionality can be embodied by one or more applications in practice.

Cryptocurrency wallet 106, digital payment platform 112, cryptocurrency exchange platform 114, and/or transaction manager 108 can each include one or more processors, and one or more computer-readable media. The computer-readable media may include computer-readable instructions executable by the one or more processors. The instructions may be embodied by one or more applications.

Application 110 operating on user device 102 can generally be any application capable of facilitating the exchange of information between the user device and cryptocurrency wallet 106, digital payment platform 112, cryptocurrency exchange platform 114, and/or transaction manager 108 in facilitating payment and transfer of cryptocurrency. In some implementations, the application(s) comprises a web application, which can run in a web browser, and could be hosted at least partially on the server-side of environment 100. In addition, or instead, the application(s) can comprise a dedicated application. In some cases, the application is integrated into the operating system (e.g., as a service). It is therefore contemplated herein that "application" be interpreted broadly.

In accordance with embodiments herein, a user initiates a transaction authorization through transaction manager 108 to transfer cryptocurrency to a non-custodial cryptocurrency wallet 106 owned by the user via application 110 (e.g., a web browser) on user device 102. The user selects the cryptocurrency wallet 106, a destination network of the cryptocurrency wallet 106, and a type of cryptocurrency. In response, a request for a signed transaction authorization by the cryptocurrency wallet 106 is generated by transaction manager 108 and displayed to the user via application 110 on user device 102. Responsive to transaction manager 108 receiving the signed transaction authorization from the cryptocurrency wallet 106, a transaction authorization code cryptographically computed by transaction manager 108 based on the signed transaction authorization and is displayed to the user via application 110 on user device 102. The user sends money from the user's account on a digital payment platform 112 to the transaction processor account name of the transaction manager 108 on the digital payment platform 112 (e.g., via application 110 on user device 102). The user includes the transaction authorization code when sending the money so that the payment confirmation from the digital payment platform 112 includes the amount of money sent by the user and the transaction authorization code. In response to transaction manager 108 receiving the payment confirmation, the signed transaction authorization is accessed based on the transaction authorization code, an amount of cryptocurrency is determined based on the amount of money from the payment confirmation and the type of cryptocurrency from the signed transaction authorization, and the amount of cryptocurrency is transferred from a cryptocurrency exchange platform 114 to the cryptocurrency wallet 106 from the signed transaction authorization.

Figure 2:
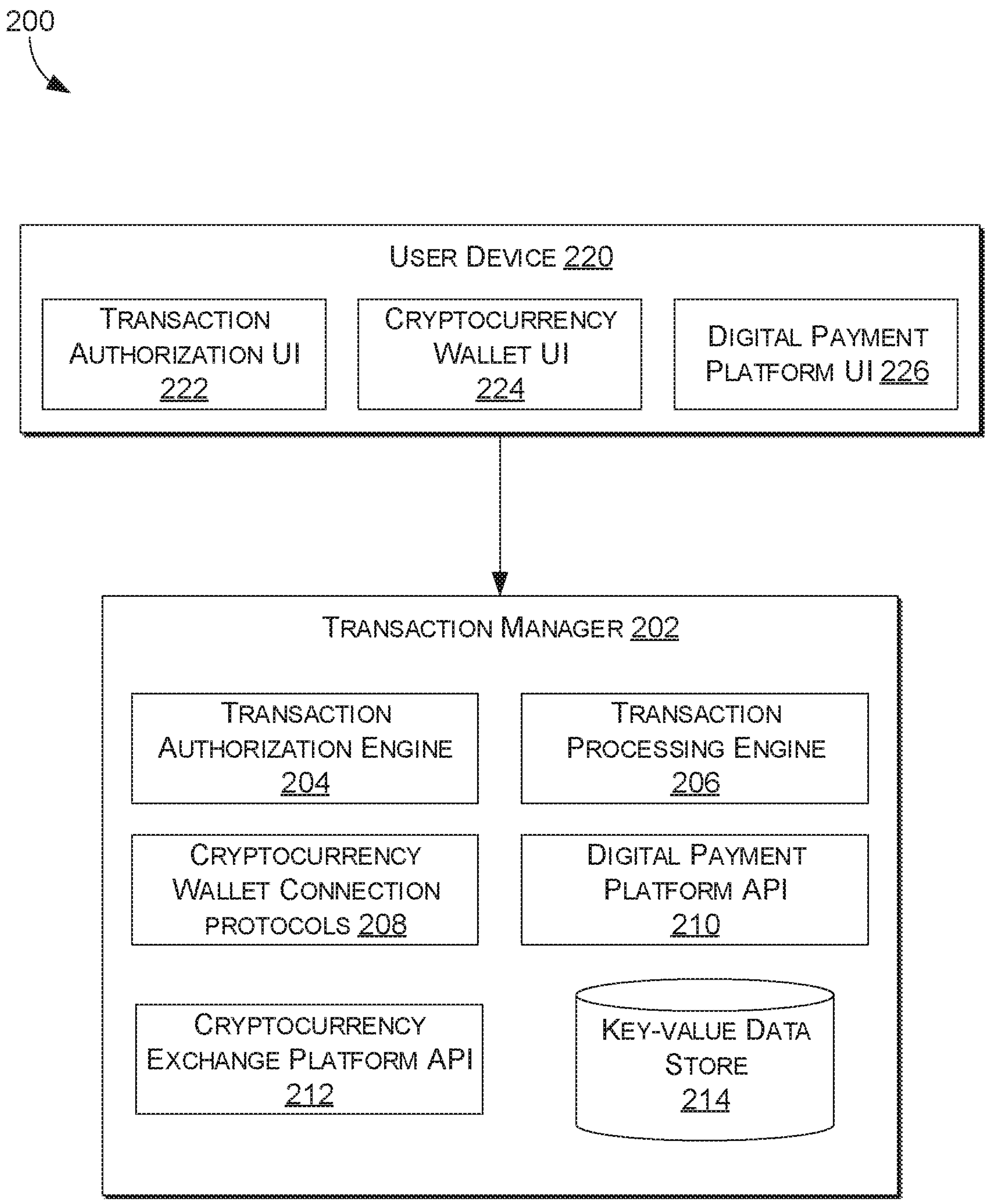
FIG. 2 depicts an example configuration of an operating environment in which some implementations of the present disclosure can be employed, in accordance with various embodiments of the present disclosure.

Turning to FIG. 2, aspects of an illustrative transaction management system 200 are shown, in accordance with various embodiments of the present disclosure. As shown in FIG. 2, transaction manager 202 includes a transaction authorization engine 204, a transaction processing engine 206, a cryptocurrency wallet connection engine 208, a digital payment platform API 210, a cryptocurrency exchange platform API 212, and a key-value data store 214. The foregoing components of transaction manager 202 can be implemented, for example, in operating environment 100 of FIG. 1. In particular, those components may be integrated into any suitable combination of user devices 102, transaction manager 108, cryptocurrency wallet 106, digital payment platform 112, and/or cryptocurrency exchange platform 114.

Transaction manager 202 (e.g., via a data store) can store computer instructions (e.g., software program instructions, routines, or services), data, and/or models used in embodiments described herein. In some implementations, key-value data store 214 can store information or data received or generated via the various components of transaction manager 202 and provides the various components with access to that information or data, as needed. The information in transaction manager 202 and key-value data store 214 may be distributed in any suitable manner across one or more data stores for storage (which may be hosted externally).

The transaction authorization engine 204 is generally configured to link a cryptocurrency wallet (e.g., cryptocurrency wallet 106 of FIG. 1) via cryptocurrency wallet connection protocols 208, generate transaction authorizations via a transaction authorization UI 222, cryptographically compute a transaction authorization code based on a signed transaction authorization, and store the signed transaction authorization with the corresponding transaction authorization code in key-value data store 214. The transaction authorization engine 204 can include rules, conditions, associations, models, algorithms, or the like to link the cryptocurrency wallet, generate transaction authorizations, cryptographically compute a transaction authorization code, and store the signed transaction authorization with the corresponding transaction authorization code. The transaction processing engine 206 is generally configured to process incoming payment confirmations from a digital payment platform API 210 of a digital payment platform (e.g., digital payment platform 112 of FIG. 1) and cause a cryptocurrency exchange platform (e.g., cryptocurrency exchange platform 114 of FIG. 1) to transfer cryptocurrency to a corresponding cryptocurrency wallet (e.g., cryptocurrency wallet 106 of FIG. 1) via cryptocurrency exchange platform API 212. The transaction authorization engine 204 can include rules, conditions, associations, models, algorithms, or the like to process incoming payment confirmations and cause a cryptocurrency exchange platform to transfer cryptocurrency.

Figure 3C:
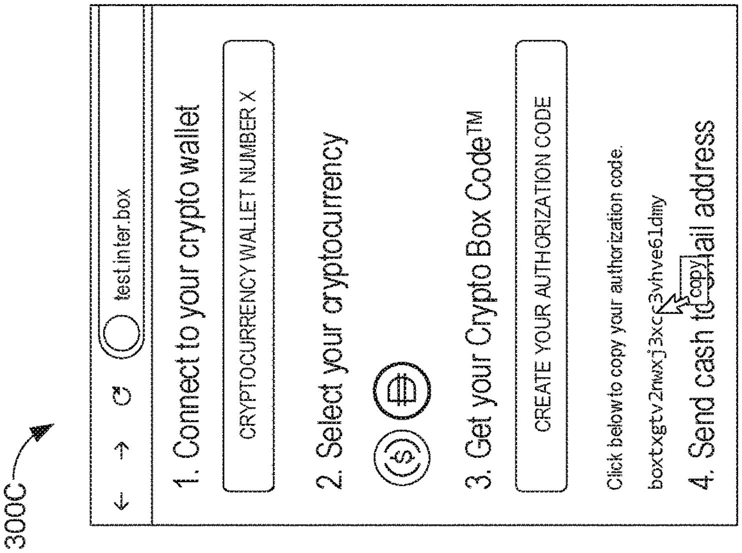
FIGS. 3A-3C provide example user interfaces implementing an example of a transaction implementing cryptographically linking a cryptocurrency wallet to a payment confirmation from a digital payment platform account, in accordance with embodiments of the present disclosure.
Figure 3B:
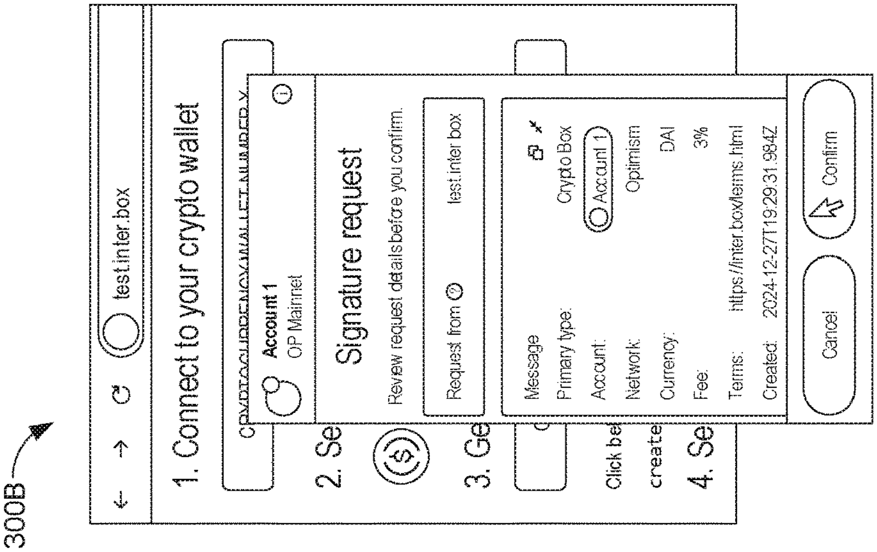
Figure 3A:
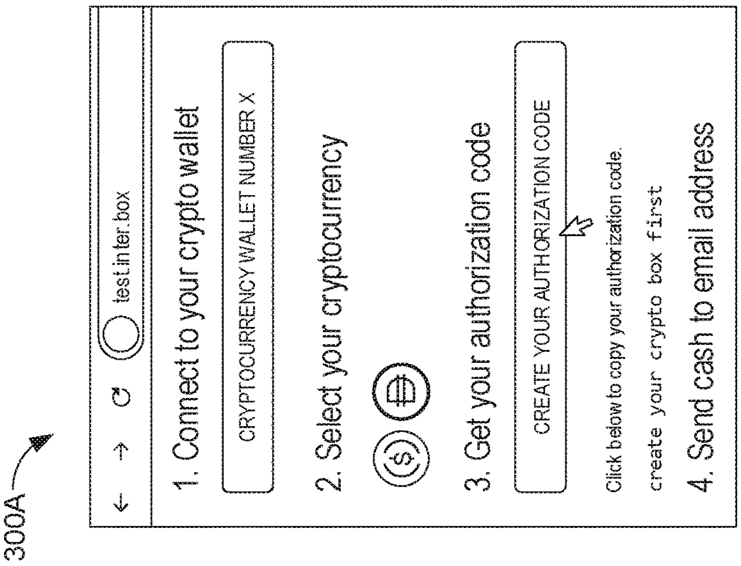

In embodiments, a user initiates a transaction authorization via transaction authorization UI 222 on user device 220 to purchase cryptocurrency and send the cryptocurrency to a cryptocurrency wallet (e.g., cryptocurrency wallet 106 of FIG. 1), such as a non-custodial wallet owned by the user. For example, a user navigates to a transaction authorization UI 222 of a website or application (e.g., application 110 of user device 102 of FIG. 1). The user connects the cryptocurrency wallet, selects a destination cryptocurrency wallet, a destination cryptocurrency wallet network and the type of cryptocurrency (e.g., Bitcoin, Ethereum, etc.) the user desires to purchase, and selects a UI element that initiates the transaction authorization. An example user interface 300A showing a user initiating a transaction authorization to purchase cryptocurrency is shown in FIG. 3A. In certain embodiments, the destination cryptocurrency wallet can only be selected from a cryptocurrency wallet that the user connects via the transaction authorization UI 222 in order to ensure that the transfer occurs exclusively between accounts owned by the same user (e.g., a cryptocurrency wallet owned by the user and the digital payment platform account owned by the user).

In certain embodiments, a transaction authorization engine 204, also referred to as a transaction authorization API, utilizes cryptocurrency wallet connection protocols 208, such as WalletConnect, in order to allow the user to connect the cryptocurrency wallet via the transaction authorization UI. 222 After connecting the cryptocurrency wallet via the cryptocurrency wallet connection protocols 208, the transaction authorization engine 204 can request the cryptocurrency wallet to sign the transaction authorization. Thus, after a transaction authorization is initiated, the cryptocurrency wallet presents the transaction authorization to the user for approval via a cryptocurrency wallet UI 224, signs the transaction authorization using the private key of the cryptocurrency wallet, and sends the signed transaction authorization to the transaction authorization engine 204.

Accordingly, in certain embodiments, the transaction authorization engine causes display of a request for a signed transaction authorization by a cryptocurrency wallet (e.g., a non-custodial cryptocurrency wallet) via a cryptocurrency wallet UI 224 on user device 220 based on a selection of the cryptocurrency wallet, a destination network of the cryptocurrency wallet, and a type of cryptocurrency via a transaction authorization UI 222. An example user interface 300B showing a request for a signed transaction authorization via a cryptocurrency wallet UI is shown in FIG. 3B. In certain embodiments, the cryptocurrency wallet UI 224 is a popup window of the transaction authorization UI 222 that is generated with the request for a signed transaction authorization through the cryptocurrency wallet. The user then selects a UI element of the popup window confirming the transaction authorization. In this regard, the cryptocurrency wallet returns the signed transaction authorization to the transaction authorization UI 222. The transaction authorization UI 222 then calls the authorization transaction authorization engine 204 with the signed transaction authorization.

In certain embodiments, the transaction authorization engine 204 generates a transaction authorization code cryptographically computed from the signed transaction authorization for display via the transaction authorization UI 222 on user device 220. The transaction authorization engine 204 stores the transaction authorization code with the signed transaction authorization in key-value data store 216. An example user interface 300C showing a transaction authorization code cryptographically computed from a signed transaction authorization is shown in FIG. 3C. In this regard, in certain embodiments, responsive to receiving the signed transaction authorization from the cryptocurrency wallet, the transaction authorization engine 204 causes display of a transaction authorization code cryptographically computed based on the signed transaction authorization via the transaction authorization UI 222 on user device 220.

In certain embodiments, the transaction authorization engine 204 validates the signed transaction authorization is signed correctly before generating the transaction authorization code. In certain embodiments, the transaction authorization engine 204 cryptographically computes the transaction authorization code from the transaction authorization using a cryptographic hash function, such as the IPFS CID algorithm. In certain embodiments, the transaction authorization engine 204 stores the transaction authorization code with the signed transaction authorization in the key-value data store 214 so that the signed transaction authorization can be looked up via the transaction authorization code (e.g., under the transaction authorization code). In certain embodiments, the key-value store 214 is configured to store and retrieve a signed transfer authorization and/or a cryptocurrency transfer confirmation (e.g., cryptocurrency transfer receipt) based on a corresponding transaction authorization code.

In certain embodiments, the transaction authorization UI 222 displays the transaction authorization code and a transaction processor account name (e.g., the email address of the transaction processing engine for payment to be sent via Zelle®) on a P2P digital payment platform (e.g., digital payment platform 112 of FIG. 1), such as a bank account-based P2P digital payment platform" (e.g., Zelle®) or a digital wallet-based P2P digital payment platform (e.g., Venmo®, Paypal®, etc.) in order for the user to send the money, such as USD or other government-issued currency (e.g., fiat money) to process the transaction. In certain embodiments, the transaction authorization UI provide a UI element to allow the user to copy the transaction authorization code.

In certain embodiments, the user sends the money via the digital payment platform UI 226 on user device 220 from the user's account on the P2P digital payment platform to the transaction processor account name on the P2P digital payment platform. The user includes the transaction authorization code with the money so that the payment confirmation includes the amount of money sent by the user and the transaction authorization code. For example, the user open the user's Zelle® supporting banking application (e.g., digital payment platform UI 226). The user adds a Zelle® recipient as the transaction processor email address. The user selects begins payment via Zelle® to the transaction processor email address as the recipient. The user selects the amount of money to send via Zelle® to the transaction processor email address as the recipient. The user copies the transaction authorization code from the transaction authorization UI 222. The user pastes the authorization code into the Zelle® payment message/memo field. The user then sends the payment with the transaction authorization code via Zelle® to the transaction processor email address as the recipient.

In certain embodiments, a transaction processing engine 206 processes incoming payments from the digital payment platform to transfer a corresponding amount of cryptocurrency to the user's cryptocurrency wallet. In this regard, responsive to the transaction processing engine 206 receiving a payment confirmation from the digital payment platform (e.g., digital payment platform 112 of FIG. 1) via a digital payment platform API 210 comprising an amount of money and the transaction authorization code, transaction processing engine 206 (1) accesses the signed transaction authorization based on the transaction authorization code from the key-value data store 214, (2) determines an amount of cryptocurrency based on the amount of money from the payment confirmation and the type of cryptocurrency from the signed transaction authorization, and (3) causes a cryptocurrency exchange platform (e.g., cryptocurrency exchange platform 114 of FIG. 1) to transfer the amount of cryptocurrency to the cryptocurrency wallet (e.g., cryptocurrency wallet 106 of FIG. 1) from the signed transaction authorization via a cryptocurrency exchange platform API 212. After the transaction processing engine 206 causes the cryptocurrency exchange platform to transfer the amount of cryptocurrency to the cryptocurrency wallet, the transaction processing engine stores 206 a cryptocurrency transfer confirmation (e.g., cryptocurrency transfer receipt) with the corresponding signed transfer authorization and corresponding transaction authorization code in key-value data store 214.

In certain embodiments, the transaction processing engine 206 extracts and/or validates the transaction authorization code from payment confirmation in order to determine the corresponding signed transaction authorization. In certain embodiments, the transaction processing engine 206 logs payments without a valid transaction authorization code. In certain embodiments, the transaction processing engine 206 ignores payment confirmations that have already been processed based on a corresponding cryptocurrency transfer confirmation stored in the key-value data store 214 for the corresponding transfer authorization code (e.g., to ensure idempotence). In certain embodiments, the transaction processing engine 206 accesses the signed transfer authorization from the key-value data store 214 using the transfer authorization code to extract the destination network and type of cryptocurrency from the signed transfer authorization. In certain embodiments, the transaction processing engine 206 overrides the destination network and/or type of cryptocurrency if necessary to initiate the transfer via the cryptocurrency exchange platform via cryptocurrency exchange platform API 212. In certain embodiments, the transaction processing engine 206 deducts a transaction fee from the amount of money sent by the user, such as a percentage of the amount of money. In certain embodiments, the transaction processing engine 206 performs smart rounding based on the transaction fee and the amount of money sent by the user. For example, if the transaction fee is 2% and the user sends $10.20, the transaction processing engine 206 rounds the transfer amount to $10.00 to deduct the transaction fee of $0.20. In certain embodiments, the transaction processing engine 206 calls the cryptocurrency exchange platform to transfer the appropriate amount to the user's cryptocurrency wallet using the specified destination network and cryptocurrency. In certain embodiments, the transaction processing engine 206 uses the transfer authorization code as an idempotency key. In certain embodiments, the transaction processing engine 206 stores the return data from the cryptocurrency exchange platform as the cryptocurrency transfer confirmation in the key-value data store 214 so that the signed transaction authorization can be looked up via the transaction authorization code (e.g., under the transaction authorization code).

In certain embodiments, a user initiates a transaction via a website or application (e.g., application 110 of FIG. 1), such as an ecommerce website or application, on user device 220. For example, a user initiates a transaction via an e-commerce website and selects an option to pay via a digital payment platform (e.g., digital payment platform 112 of FIG. 1). In this regard, the transaction authorization engine 204 causes display of a request for a transaction authorization comprising transaction details of a transaction via transaction authorization UI 222 of user device 220 (e.g., as a popup on the ecommerce website). For example, the transaction details can include a transaction identifier for the particular transaction, customer information, such as the customer's account, name, email billing address, shipping address, and/or other customer information, payment information, such as the payment amount due for the transaction, product or service information, such as the product or service name that the customer desires to purchase, quantities, prices and/or other details regarding the product or service that customer desire to purchase, and/or the like.

In certain embodiments, responsive to receiving the transaction authorization via the website or application, the transaction authorization engine 204 causes display of a transaction authorization code cryptographically computed based on the transaction authorization via transaction authorization UI 222 on user device 220. For example, the transaction authorization code can be cryptographically computed based on the transaction details of the transaction in order to cryptographically link the transaction to the transaction authorization code. The transaction authorization engine 204 stores the transaction authorization code with the transaction authorization in the key-value data store 214.

In certain embodiments, the user sends the money via the digital payment platform (e.g., digital payment platform 112 of FIG. 1) from the user's account via the digital payment platform UI 226 and includes the transaction authorization code with the payment. For example, the user sends the payment with the transaction authorization code from the user's account on the P2P digital payment platform to the transaction processor account name, such as the ecommerce account name, on the P2P digital payment platform. In this regard, responsive to the transaction processing engine 206 receiving a payment confirmation from a digital payment platform via the digital payment platform API 210 comprising an amount of money and the transaction authorization code, the transaction processing engine 206 (1) accesses the transaction authorization based on the transaction authorization code from the key-value data store 214 and (2) initiates the transaction based on the transaction details and the amount of money. For example, the transaction processing engine 206 determines whether the amount of money meets the required amount of money of the transaction details before confirming the transaction to initiate providing the customer with the purchased product or service.

Figure 5:
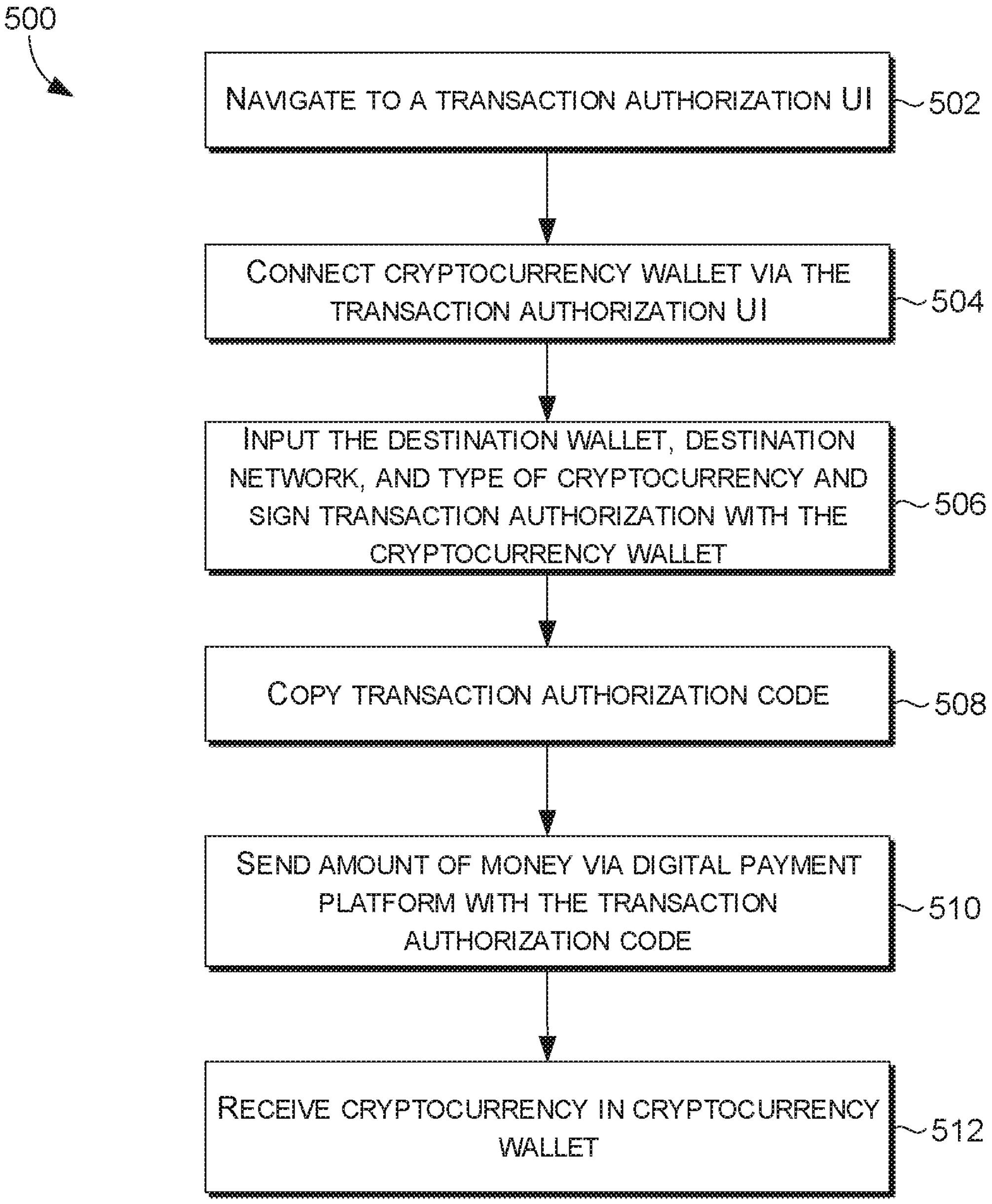
FIG. 5 is another process flow showing a method for cryptographically linking a cryptocurrency wallet to a payment confirmation from a digital payment platform account, in accordance with embodiments of the present disclosure.
Figure 6:
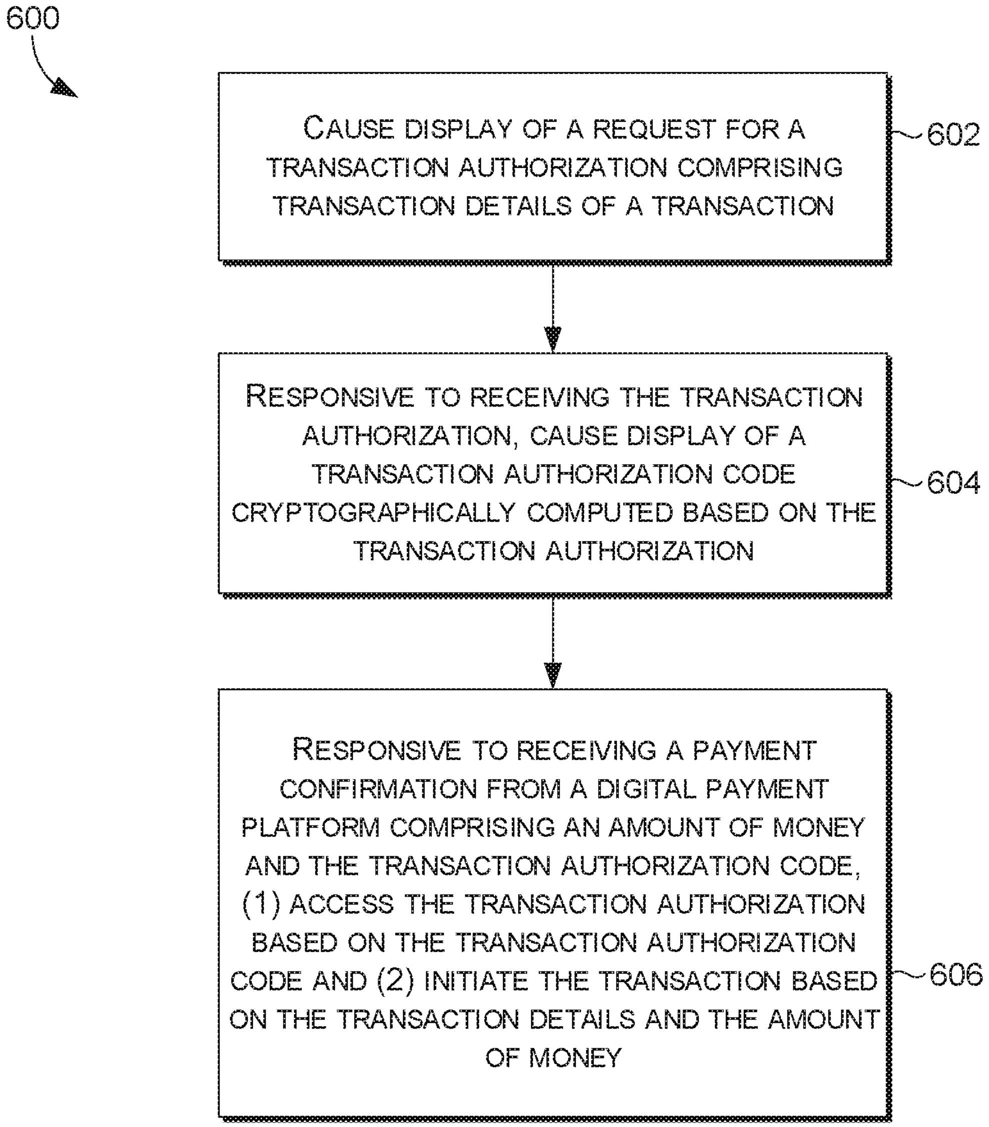
FIG. 6 is a process flow showing a method for cryptographically linking a transaction to a payment confirmation from a digital payment platform account, in accordance with embodiments of the present disclosure.

With reference now to FIGS. 4-6, FIGS. 4-6 provide method flows related to facilitating cryptographically linking a cryptocurrency wallet to a payment confirmation from a digital payment platform account, in accordance with embodiments of the present technology. Each block of method 400, 500 and 600 comprises a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method flows of FIGS. 4-6 are exemplary only and not intended to be limiting. As can be appreciated, in some embodiments, method flows 400-600 can be implemented, at least in part, to facilitate cryptographically linking a cryptocurrency wallet to a payment confirmation from a digital payment platform account.

Turning to FIG. 4, a flow diagram is provided showing an embodiment of a method 400 for cryptographically linking a cryptocurrency wallet to a payment confirmation from a digital payment platform account, in accordance with embodiments described herein. Initially, at block 402, a request for a signed transaction authorization is displayed by a cryptocurrency wallet based on a selection of the cryptocurrency wallet and a type of cryptocurrency. In certain embodiments, the cryptocurrency wallet is connected via cryptocurrency wallet connections protocols prior to causing display of the request for the signed transaction authorization. In certain embodiments, an interface for the selection of the cryptocurrency wallet, a destination network of the cryptocurrency wallet, and the type of cryptocurrency is displayed. In certain embodiments, the request for the signed transaction authorization is displayed in a popup window of the interface. In certain embodiments, the cryptocurrency wallet is a non-custodial cryptocurrency wallet. In certain embodiments, the cryptocurrency wallet is a custodial cryptocurrency wallet At block 404, responsive to receiving the signed transaction authorization from the cryptocurrency wallet, a transaction authorization code cryptographically computed based on the signed transaction authorization is displayed. In certain embodiments, the transaction authorization code is cryptographically computed based on the signed transaction authorization using a cryptographic hash function. In certain embodiments, the transaction authorization code is stored with the signed transaction authorization in a key-value data store.

At block 406, responsive to receiving a payment confirmation from a digital payment platform comprising an amount of money and the transaction authorization code, (1) the signed transaction authorization is accessed based on the transaction authorization code, (2) an amount of cryptocurrency is determined based on the amount of money from the payment confirmation and the type of cryptocurrency from the signed transaction authorization, and (3) a cryptocurrency exchange platform transfers the amount of cryptocurrency to the cryptocurrency wallet from the signed transaction authorization. In certain embodiments, a cryptocurrency transfer confirmation received from the cryptocurrency exchange platform based on transferring the amount of cryptocurrency to the cryptocurrency wallet is accessed. In certain embodiments, the cryptocurrency transfer confirmation is stored with the transaction authorization code and the signed transaction authorization in the key-value data store. In certain embodiments, the digital payment platform is a bank account-based peer-to-peer digital payment platform. In certain embodiments, the digital payment platform is a digital wallet-based peer-to-peer digital payment platform. In certain embodiments, a subsequent payment confirmation from the digital payment platform is ignored based on accessing a cryptocurrency transfer confirmation based on the transfer authorization code in the subsequent payment confirmation. In certain embodiments, smart rounding is used to deduct a transaction fee based on the amount of money Turning to FIG. 5, a flow diagram is provided showing another embodiment of a method 500 for cryptographically linking a cryptocurrency wallet to a payment confirmation from a digital payment platform account, in accordance with embodiments described herein. Initially, at block 502, a user navigates to a transaction authorization UI. For example, a user initiates a transaction authorization to purchase cryptocurrency and send the cryptocurrency to a cryptocurrency wallet, such as a non-custodial wallet owned by the user. At block 504, the user connects a cryptocurrency wallet via the transaction authorization UI. For example, the cryptocurrency wallet can be connected to the transaction authorization UI via cryptocurrency wallet connection protocols, such as WalletConnect.

At block 506, the user inputs the destination wallet, destination network, and type of cryptocurrency and signs the transaction authorization with the cryptocurrency wallet. For example, the user connects the cryptocurrency wallet, selects a destination cryptocurrency wallet, a destination cryptocurrency wallet network and the type of cryptocurrency (e.g., Bitcoin, Ethereum, etc.) the user desires to purchase, and selects a UI element that initiates the transaction authorization. In certain embodiments, the destination cryptocurrency wallet can only be selected from a cryptocurrency wallet that the user connects via the transaction authorization UI in order to ensure that the transfer occurs exclusively between accounts owned by the same user (e.g., a cryptocurrency wallet owned by the user and the digital payment platform account owned by the user). After connecting the cryptocurrency wallet via the cryptocurrency wallet connection protocols, the cryptocurrency wallet can be requested to sign the transaction authorization. Thus, after a transaction authorization is initiated, the cryptocurrency wallet presents the transaction authorization to the user for approval via a cryptocurrency wallet UI and the user signs the transaction authorization using the private key of the cryptocurrency wallet.

At block 508, the user copies the transaction authorization code. In certain embodiments, the transaction authorization UI provide a UI element to allow the user to copy the transaction authorization code. At block 510, the user sends an amount of money via digital payment platform with the transaction authorization code. For example, the user sends the money via a P2P digital payment platform UI from the user's account on the P2P digital payment platform to the transaction processor account name on the P2P digital payment platform. The user includes the transaction authorization code with the money so that the payment confirmation includes the amount of money sent by the user and the transaction authorization code.

At block 512, the user receives cryptocurrency in the cryptocurrency wallet. For example, a cryptocurrency exchange platform transfers an amount of cryptocurrency to the cryptocurrency wallet from the signed transaction authorization based on the amount of money from the payment confirmation and the type of cryptocurrency from the signed transaction authorization.

Turning to FIG. 6, a flow diagram is provided showing an embodiment of a method 600 for cryptographically linking a transaction to a payment confirmation from a digital payment platform account, in accordance with embodiments described herein. Initially, at block 602, a request for a transaction authorization is displayed comprising transaction details of a transaction. For example, a user initiates a transaction via an e-commerce website and selects an option to pay via a digital payment platform. In this regard, the transaction authorization engine causes display of a request for a transaction authorization comprising transaction details of a transaction. For example, the transaction details can include a transaction identifier for the particular transaction, customer information, such as the customer's account, name, email billing address, shipping address, and/or other customer information, payment information, such as the payment amount due for the transaction, product or service information, such as the product or service name that the customer desires to purchase, quantities, prices and/or other details regarding the product or service that customer desire to purchase, and/or the like.

At block 604, responsive to receiving the transaction authorization, a transaction authorization code cryptographically computed based on the transaction authorization is displayed. For example, the transaction authorization code can be cryptographically computed based on the transaction authorization in order to cryptographically link the transaction to the transaction authorization code.

At block 606, responsive to receiving a payment confirmation from a digital payment platform comprising an amount of money and the transaction authorization code, (1) the transaction authorization is accessed based on the transaction authorization code and (2) the transaction is initiated based on the transaction details and the amount of money. For example, the payment processing engine determines whether the amount of money meets the required amount of money of the transaction details before confirming the transaction to initiate providing the customer with the purchased product or service.

Having briefly described an overview of aspects of the technology described herein, an exemplary operating environment in which aspects of the technology described herein may be implemented is described below in order to provide a general context for various aspects of the technology described herein.

Figure 7:
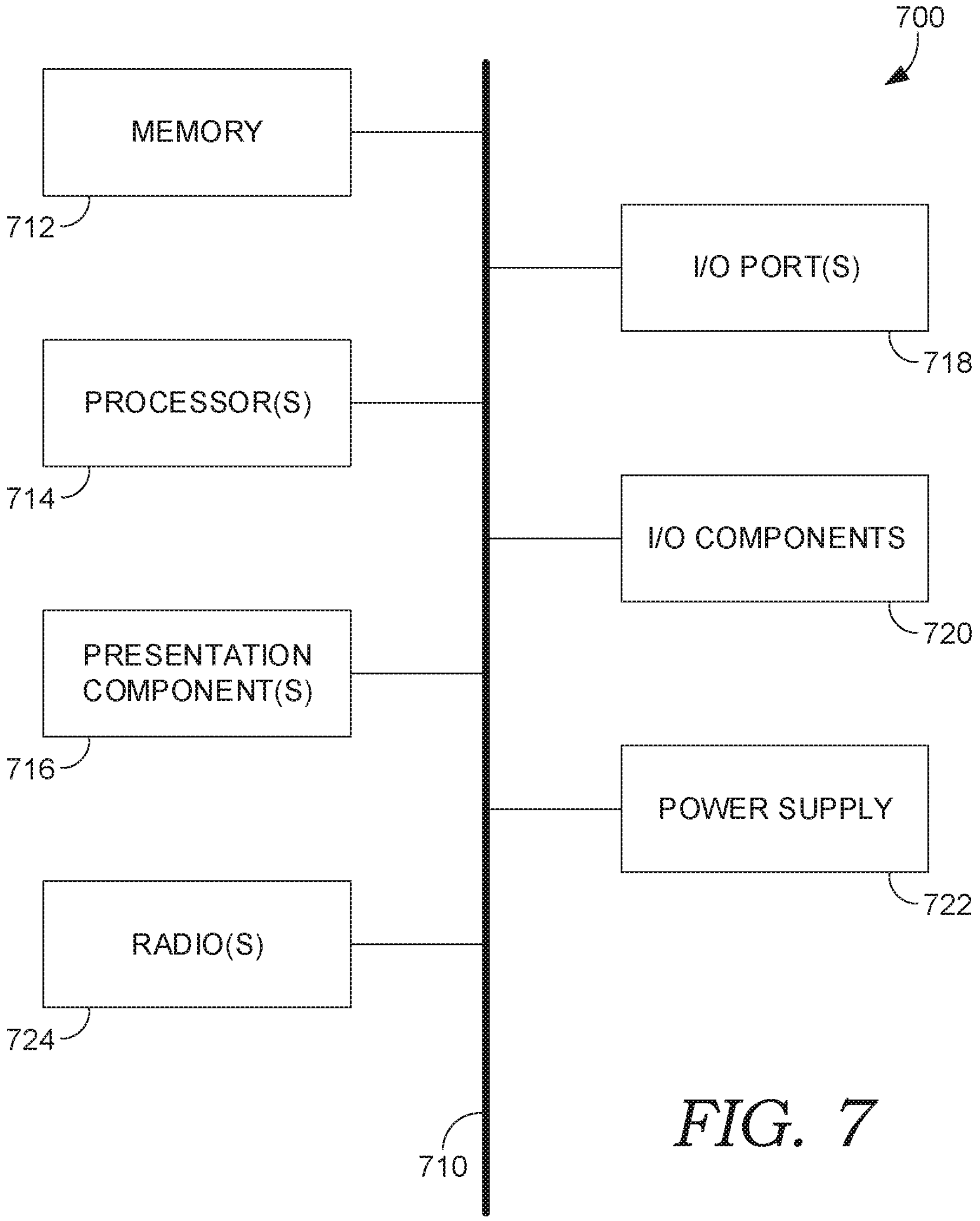
FIG. 7 is a block diagram of an example computing device in which embodiments of the present disclosure can be employed.

Referring to the drawings in general, and initially to FIG. 7 in particular, an exemplary operating environment for implementing aspects of the technology described herein is shown and designated generally as computing device 700. Computing device 700 is just one example of a suitable computing environment and is not intended to suggest any limitation as to the scope of use or functionality of the technology described herein. Neither should the computing device 700 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 7, computing device 700 includes a bus 710 that directly or indirectly couples the following devices: memory 712, one or more processors 714, one or more presentation components 716, input/output (I/O) ports 718, I/O components 720, an illustrative power supply 722, and a radio(s) 724. Bus 710 represents what may be one or more buses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 7 is merely illustrative of an exemplary computing device that can be used in connection with one or more aspects of the technology described herein. Distinction is not made between such categories as "workstation," "server," "laptop," and "handheld device," as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer storage media in the form of volatile and/or nonvolatile memory. The memory 712 may be removable, non-removable, or a combination thereof. Exemplary memory includes solid-state memory, hard drives, and optical-disc drives. Computing device 700 includes one or more processors 714 that read data from various entities such as bus 710, memory 712, or I/O components 720. Presentation component(s) 716 present data indications to a user or other device. Exemplary presentation components 716 include a display device, speaker, printing component, and vibrating component. I/O port(s) 718 allow computing device 700 to be logically coupled to other devices including I/O components 720, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 714 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 700. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

A computing device may include radio(s) 724. The radio 724 transmits and receives radio communications. The computing device may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

What is claimed is:

1. A computer-implemented method comprising:

causing display, via a transaction manager, of a request for a signed transaction authorization by a cryptocurrency wallet based on a selection of the cryptocurrency wallet and a type of cryptocurrency;

responsive to receiving the signed transaction authorization from the cryptocurrency wallet, causing display, via the transaction manager, of a transaction authorization code cryptographically computed based on the signed transaction authorization; and responsive to receiving a payment confirmation from a digital payment platform comprising an amount of money and the transaction authorization code:

accessing, via the transaction manager, the signed transaction authorization based on the transaction authorization code in the payment confirmation;

determining, via the transaction manager, an amount of cryptocurrency based on the amount of money from the payment confirmation and the type of cryptocurrency from the signed transaction authorization; and causing, via the transaction manager, a cryptocurrency exchange platform to transfer the amount of cryptocurrency to the cryptocurrency wallet.

2. The computer-implemented method of claim 1, further comprising:

cryptographically computing, via the transaction manager, the transaction authorization code based on the signed transaction authorization using a cryptographic hash function; and storing, via the transaction manager, the transaction authorization code with the signed transaction authorization in a key-value data store.

3. The computer-implemented method of claim 1, further comprising:

accessing, via the transaction manager, a cryptocurrency transfer confirmation from the cryptocurrency exchange platform based on transferring the amount of cryptocurrency to the cryptocurrency wallet; and storing, via the transaction manager, the cryptocurrency transfer confirmation with the transaction authorization code and the signed transaction authorization in a key-value data store.

4. The computer-implemented method of claim 1, further comprising:

connecting, via the transaction manager, the cryptocurrency wallet via cryptocurrency wallet connections protocols prior to causing display of the request for the signed transaction authorization.

5. The computer-implemented method of claim 1, further comprising:

causing display, via the transaction manager, of an interface for the selection of the cryptocurrency wallet, a destination network of the cryptocurrency wallet, and the type of cryptocurrency; and causing display, via the transaction manager, of the request for the signed transaction authorization in a popup window of the interface.

6. The computer-implemented method of claim 1, wherein the digital payment platform is a bank account-based peer-to-peer digital payment platform.

7. The computer-implemented method of claim 1, wherein the digital payment platform is a digital wallet-based peer-to-peer digital payment platform.

8. The computer-implemented method of claim 1, wherein the cryptocurrency wallet is a non-custodial cryptocurrency wallet.

9. The computer-implemented method of claim 1, wherein the cryptocurrency wallet is a custodial cryptocurrency wallet.

10. The computer-implemented method of claim 1, further comprising:

ignoring, via the transaction manager, a subsequent payment confirmation from the digital payment platform based on accessing a cryptocurrency transfer confirmation based on the transaction authorization code in the subsequent payment confirmation.

11. The computer-implemented method of claim 1, further comprising:

using smart rounding to deduct a transaction fee based on the amount of money.

12. One or more computer-readable media having a plurality of executable instructions embodied thereon, which, when executed by one or more processors, cause the one or more processors to perform a method comprising:

processing, via a transaction manager, a selection of a cryptocurrency wallet and a type of cryptocurrency to generate a request for a signed transaction authorization by the cryptocurrency wallet based on the selection;

responsive to receiving the signed transaction authorization from the cryptocurrency wallet, cryptographically computing, via the transaction manager, a transaction authorization code based on the signed transaction authorization; and responsive to receiving a payment confirmation from a digital payment platform comprising an amount of money and the transaction authorization code:

accessing, via the transaction manager, the signed transaction authorization based on the transaction authorization code in the payment confirmation;

determining, via the transaction manager, an amount of cryptocurrency based on the amount of money from the payment confirmation and the type of cryptocurrency from the signed transaction authorization; and causing, via the transaction manager, a cryptocurrency exchange platform to transfer the amount of cryptocurrency to the cryptocurrency wallet.

13. The one or more computer-readable media of claim 12, the method further comprising:

cryptographically computing, via the transaction manager, the transaction authorization code based on the signed transaction authorization using a cryptographic hash function; and storing, via the transaction manager, the transaction authorization code with the signed transaction authorization in a key-value data store.

14. The one or more computer-readable media of claim 12, the method further comprising:

accessing, via the transaction manager, a cryptocurrency transfer confirmation from the cryptocurrency exchange platform based on transferring the amount of cryptocurrency to the cryptocurrency wallet; and storing, via the transaction manager, the cryptocurrency transfer confirmation with the transaction authorization code and the signed transaction authorization in a key-value data store.

15. The one or more computer-readable media of claim 12, the method further comprising:

connecting, via the transaction manager, the cryptocurrency wallet via cryptocurrency wallet connections protocols prior to causing display of the request for the signed transaction authorization.

16. The one or more computer-readable media of claim 12, the method further comprising:

causing display, via the transaction manager, of an interface for the selection of the cryptocurrency wallet, a destination network of the cryptocurrency wallet, and the type of cryptocurrency; and causing display, via the transaction manager, of the request for the signed transaction authorization in a popup window of the interface.

17. The one or more computer-readable media of claim 12, wherein the digital payment platform is a bank account-based peer-to-peer digital payment platform.

18. The one or more computer-readable media of claim 12, wherein the cryptocurrency wallet is a non-custodial cryptocurrency wallet.

19. A computing system comprising:

a processor; and a non-transitory computer-readable medium having stored thereon instructions that when executed by the processor, cause the processor to perform operations including:

causing display, via a transaction manager, of a request for a signed transaction authorization by a cryptocurrency wallet based on a selection of the cryptocurrency wallet and a type of cryptocurrency;

responsive to receiving the signed transaction authorization, causing display, via the transaction manager, of a transaction authorization code cryptographically computed based on the signed transaction authorization; and responsive to receiving a payment confirmation from a digital payment platform comprising an amount of money and the transaction authorization code:

accessing, via the transaction manager, the signed transaction authorization based on the transaction authorization code in the payment confirmation;

determining, via the transaction manager, an amount of cryptocurrency based on the amount of money from the payment confirmation and the type of cryptocurrency from the signed transaction authorization; and causing, via the transaction manager, a cryptocurrency exchange platform to transfer the amount of cryptocurrency to the cryptocurrency wallet.

20. The computing system of claim 19, the operations further including:

cryptographically computing, via the transaction manager, the transaction authorization code based on the signed transaction authorization using a cryptographic hash function; and storing, via the transaction manager, the transaction authorization code with the signed transaction authorization in a key-value data store.

* * * * *